Jan. 26, 1971    D. A. KUGATH ET AL    3,557,627
APPARATUS FOR COMPENSATING INERTIAL EFFECTS

Filed Dec. 26, 1968    2 Sheets-Sheet 1

Inventors:
Donald A Kugath,
Ralph S. Mosher,
by Julius J Zaskalicky
Their Attorney

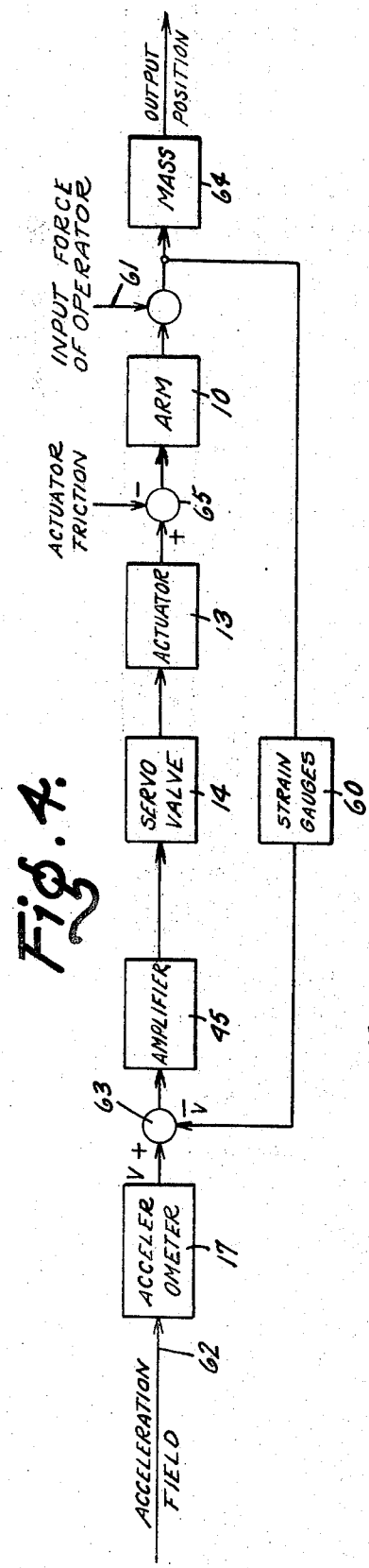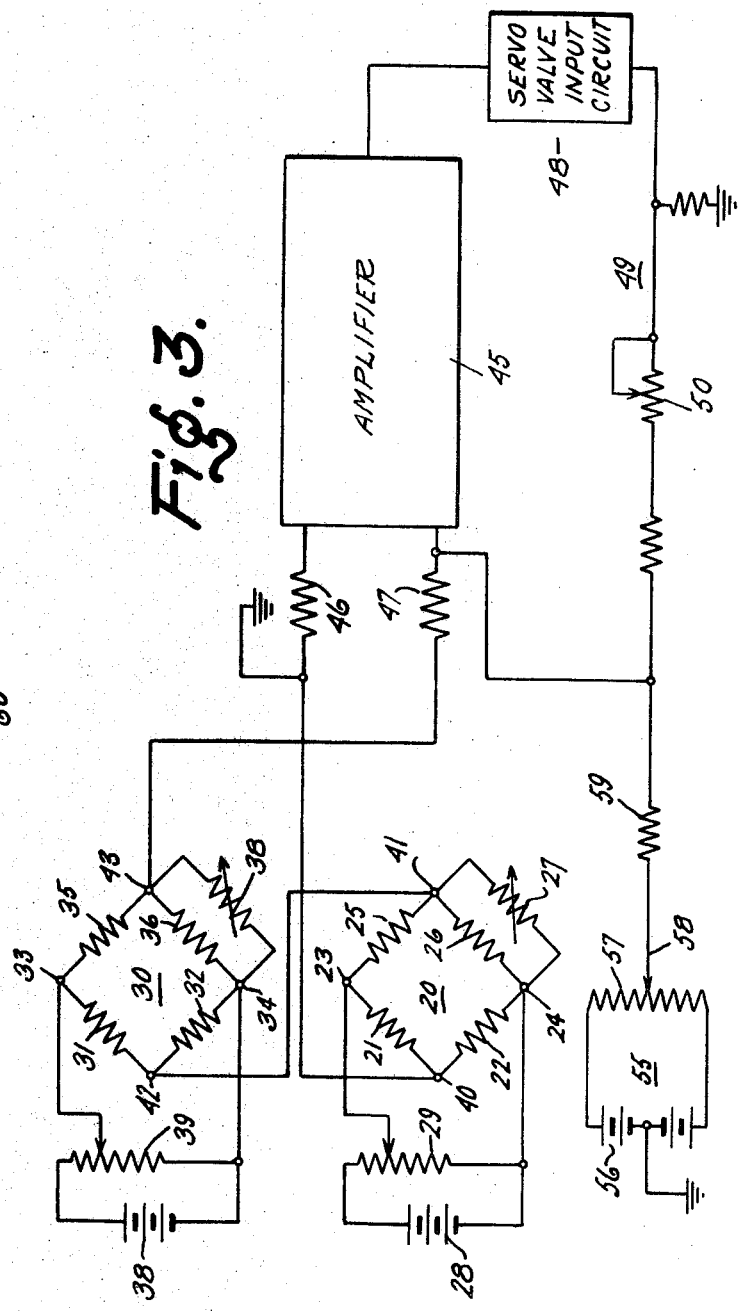

United States Patent Office 3,557,627
Patented Jan. 26, 1971

3,557,627
APPARATUS FOR COMPENSATING INERTIAL EFFECTS
Donald A. Kugath, Scotia, and Ralph S. Mosher, Schenectady, N.Y., assignors to General Electric Company, a corporation of New York
Filed Dec. 26, 1968, Ser. No. 787,159
Int. Cl. G01p 15/00
U.S. Cl. 73—514                                           4 Claims

ABSTRACT OF THE DISCLOSURE

Apparatus for maintaining the limb of an operator in a relatively fixed position with respect to his body when he is subject to an acceleration field yet allow the operator to move the limb freely with respect to his body. A lever arm member adapted to hold the limb of the operator is mounted at one end to pivot about a pivotal axis by means of a rotary actuator. The rotary actuator is responsive to the difference of a signal representing strain produced in the lever arm member by the acceleration of the lever arm member about the pivotal axis and a signal representing the acceleration of the pivotal axis in a direction perpendicular to the longitudinal axis of the lever arm member and the pivotal axis. When the lever arm member and the actuator are subject to a common acceleration field the member is maintained substantially stationary with respect to the point and when a force is applied to the member to pivot the member about the point, the actuator aids the movement of member in the direction of the applied force.

---

The present invention relates in general to servo systems for counterbalancing forces on members and, in particular, relates to servo systems for allowing movement of a member in an object system unimpeded by forces acting on the system.

Such servo systems would be useful in vehicles such as a centrifuge or an airplane to counteract the acceleration forces to which the limbs of an operator are subjected. Heretofore, it has been proposed that counterweights be employed in connection with a harness for the limbs of the operator to counteract the acceleration forces to which the limbs are subjected. Such an arrangement adds inertia to the system and inherently involves frictional torques. Accordingly, not only does it take considerable force to move a counterbalancing arrangement but it is also cumbersome especially when such an arrangement is used to restrain the whole body of an operator. In addition, such an arrangement is slow in action because of the movement of inertia of the counterweight. A need exists for a servo restraint system for applications such as described above to allow an operator to move his limbs with minimal restraint, that is, a system is needed for nullifying the effect of a vehicle's acceleration field. At the same time the system should allow relatively effortless movement of the limbs of the operator.

Accordingly, it is an important object of the present invention to provide a system which is simple in organization and small in size to allow positioning of a mass such as an arm of an operator in a system which is subject to acceleration to render the mass substantially independent of the acceleration forces of the system thereby permitting relatively unimpeded movement of the mass relative to the system.

Another object of the present invention is to provide a system of the character described which is in addition responsive to small forces applied to a load.

Another object of the present invention is to provide a servo system of the character described which is light in weight and does not require the use of counter weights.

Another object of the present invention is to provide a servo system of the character described which is fast in response and of high sensitivity.

Another object of the present invention is to provide a servo system of the character described which is flexible in operation to permit fail-safe arrangements to be used in connection therewith in the event that the power for the system is interrupted.

A further object of the present invention is to provide a counter balancing system for counter balancing weights and forces which do not require weights for their operation.

A still further object of the present invention is to provide a load moving system which is responsive to small forces applied to the load.

In accordance with an illustrative embodiment of the present invention, there is provided a lever arm pivoted about a point. An actuator is provided for rotating the lever arm about the point. Strain gages provided on the lever arm develop a signal corresponding to the magnitude and direction of the strain thereof in response to the acceleration to which the lever arm is subjected. An accelerometer is provided for sensing the acceleration of the pivot point and developing a second signal corresponding to the direction of magnitude of such acceleration. A means is provided responsive to the first signal for providing driving power to drive the actuator in a direction to aid the driving force on the lever arm, and also responsive to the second signal for providing driving power to drive the actuator in a direction in opposition to the force producing acceleration of the pivot point.

The features of our invention which we desire to protect herein are pointed out with particularity in the appended claims. The invention itself, however, both as to its organization and method of operation together with further objects and advantages thereof may best be understood by reference to the following description taken in connection with the accompanying drawings wherein:

FIG. 3 is a schematic diagram of the electrical interconnections of the apparatus of FIGS. 1 and 2.

FIG. 4 is a block diagram of the embodiment of FIGS. 1, 2 and 3.

Figure 1:
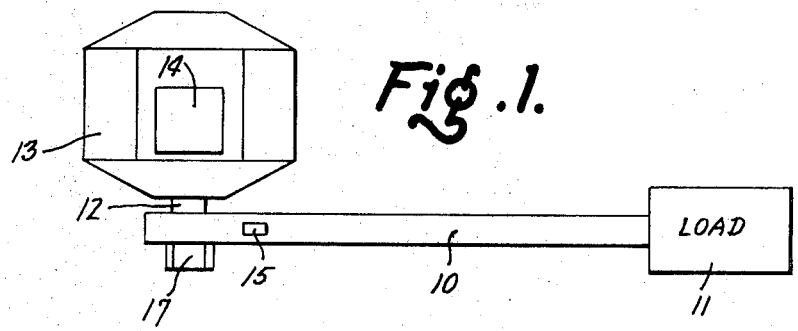
FIG. 1 is a plan view of servo restraint apparatus in accordance with one embodiment of our invention showing the elements and physical location thereof.
Figure 2:
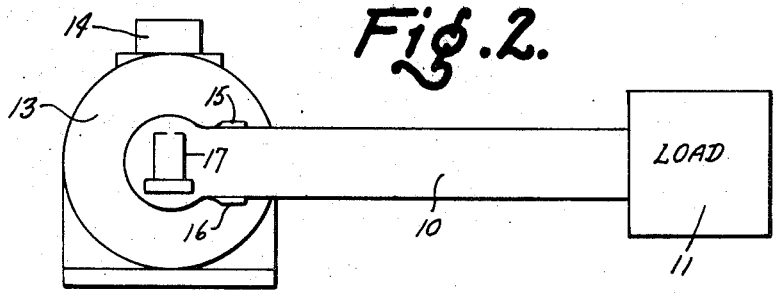
FIG. 2 is a front view of the apparatus of FIG. 1.

Referring now to FIGS. 1 and 2, there is shown the physical organization of an illustrative embodiment of a servo restraint system in accordance with the present invention. An arm member 10 is provided at one end of which is located a load 11 which simulates the mass of an element such as the limb of an operator. The other end of the member 10 is secured to the shaft 12 of a rotary hydraulic actuator 13. The arm member 10 is pivotable about the axis of the shaft 12. The actuator 13 is controlled by a servo valve 14 of the flow type which is responsive to electrical signals received from an amplifier to be described in connection with the electrical diagram of FIG. 3. A pair of strain gages at 15 and 16 are secured to the upper and lower sides of the arm member 10 adjacent the pivot axis or point thereof to measure strains produced in the upper and lower surfaces of the arm member by forces acting thereon, such as forces exerted by the arm of an operator and forces external to the operator.

The strain gages at 15 and 16 may be of a type incorporating resistive elements the resistance of which changes in response to strains applied thereto. The configuration of the strain gage resistive elements may be in the form of a Wheatstone bridge in which a pair of remote arms thereof are disposed to measure either positive or negative strain and the other pair of which is disposed to measure strain of opposite sense to the first pair. The bridge is arranged to be in balance in the absence of any strain on the member. Accordingly, when bending strain appears in arm member 10, the resistance of the aforementioned pairs of gages changes and produces an unbalance in the impedance level of the output terminals of the bridge. A voltage applied across a pair of input terminals of the bridge will result in a signal across the output terminals which is representative of the magnitude and direction of the strain. Such devices are well known in the art and commonly available, for example, the strain gage may be a SR–4 metal foil gage made by Baldwin Lima Hamilton.

An accelerometer 17 is also connected to the end of the arm member 10 secured to the shaft of the rotary actuator and is disposed to sense the acceleration of the region of attachment of the arm member 10 to the shaft 12 in a direction perpendicular to the arm member. The accelerometer 17 may be any of a variety of such devices for producing an output signal representing the magnitude and direction of the acceleration applied thereto. For example, the accelerometer may include strain gage elements electrically connected in the form of a Wheatstone bridge and physically mounted on a plate member subject to strain to sense strain therein. The stress in the plate member which is a function of the acceleration thereof may be produced by attaching a mass thereto. Acceleration of assembly such as described causes the mass to exert a force on the plate member, and accordingly produces an impedance unbalance in the Wheatstone bridge. The character of the unbalance in magnitude and direction is determined by the magnitude and direction of the applied acceleration. Such accelerometers are well known in the art and are commonly available, for example, the accelerometer may be a type 4–203–001 made by Consolidated Electrodynamic Corporation.

Referring now to FIG. 3, there is shown an electrical schematic diagram partially in block form illustrating the manner of interconnection of the elements described in connection with FIGS. 1 and 2. In this figure, Wheatstone bridge 20 corresponds to the electrical portion of the strain gages at 15 and 16. The second Wheatstone bridge 30 corresponds to the electrical portion of the accelerometer 17. The Wheatstone bridge 20 includes a pair of resistors 21 and 22 connected in series between a pair of energizing or input terminals 23 and 24 and also includes another pair of resistors 25 and 26 connected in series between the input terminals 23 and 24. Resistor 26 has a variable resistance 27 in shunt therewith to permit balance setting of the bridge. Resistors 21 and 26 in opposite legs of the two branches would be placed to measure one sense of the bending strain and resistors 22 and 25 would be placed to measure the opposite sense of bending strain. Resistors 21 and 26 could correspond to element 15 and resistors 25 and 22 could correspond to element 16. Energization is provided to bridge 20 by a DC power supply which could be a battery 28 shunted by a potentiometer 29. Terminal 24 is connected to the negative terminal of the battery 28 and terminal 23 is connected to the center tap of the potentiometer 29.

Similarly, the Wheatstone bridge 30 includes a branch having resistors 31 and 32 connected between the energizing terminals 33 and 34 and another branch having resistors 35 and 36 connected in series between the energizing terminals 33 and 34. Resistor 36 has a balancing potentiometer or variable resistor 38 connected in shunt therewith. Resistors 31 and 36 in opposite legs of the two branches would be placed parallel to direction of strain and resistors 32 and 35 would be placed perpendicular thereto on the plate to which they would be mounted as described above. Energization is applied to the energizing terminals 33 and 34 by a DC power supply which could be a battery 38 shunted by a potentiometer 39. Terminal 34 is connected to the negative terminal of the battery 38 and terminal 33 is connected to the center tap of the potentiometer 39.

The outputs of the Wheatstone bridges 20 and 30 are connected in series and applied to an amplifier 45. Terminal 40 at the junction of resistors 21 and 22, and terminal 41 at the junction of resistors 25 and 26 are the output terminals of the bridge 20. Terminal 42 at the junction of resistors 31 and 32, and terminal 43 at the junction of resistors 35 and 36 are the corresponding output terminals of bridge 30. Terminal 41 is connected to terminal 42. Terminal 40 is connected through an input resistor 46 to an input terminal of the amplifier 45. Terminal 43 is connected through another input resistor 47 to another input terminal of the amplifier 45. The output of the amplifier 45 is applied to the electrical input 48 of the servo valve 14 which provides hydraulic input to the rotary actuator 13 to move the rotary actuator in the appropriate direction as will be described below. The signal from the bridge 20 is arranged so that it provides a signal which aids or moves the rotary actuator 13 in a direction to remove any strain appearing in the arm member 10. The signal from the bridge 30 is phased so that it provides a signal which drives the rotary actuator 13 in a direction opposing the force producing the signal. A network 49, including a variable resistor 50, is connected between the output of the amplifier 45 and the input thereof to provide degenerative feedback thereto. Variable resistor 50 provides a means for varying the gain of the amplifier 45. A bias source 55 which could consist of a battery 56 shunted by potentiometer 57 having variable tap 58 is provided. Tap 58 is connected through a series isolation resistor 59 to the input of the amplifier and provides a biasing adjustment for the amplifier 45. Suitable electrical grounding is provided at the input and output circuits of the amplifier 45.

The system described in connection with FIGS. 1, 2 and 3 is represented in block diagram form in FIG. 4 wherein the rectangular blocks represent the various elements described in the aforementioned figures and the circles represent force balance areas or points in the system. Block 17 represents the accelerometer and block 60 represents the strain gages at 15 and 16. The strain gages 60 will respond to any force applied perpendicular to the arm member 10. This force may be in the form of the input force from the limb of an operator designated by vector 61 or it may be the force exerted on the arm member 10 produced by acceleration of the system and represented by accelerating field vector 62. The accelerometer 17 senses and measures the acceleration field in a direction perpendicular to the long dimension of the arm member 10. The outputs from the accelerometer 17 and the strain gages 60 are combined differentially as indicated by the plus and minus signs adjacent the arrows at balance circle 63 and are applied to the amplifier 45. The output of the amplifier 45 drives the servo valve 14 which in turn drives the actuator 13 to produce a force on the arm member 10 which moves the arm member in a direction to reduce the strain applied thereto by the input force thereon. The block 64 represents the total mass of the arm member 10 and load 11. The balance circle 65 represents the point of application of the friction of the actuator 13.

To set up the servo restraint system of FIGS. 1, 2, 3 and 4 for operation, the arm member 10 is positioned in a direction such that the accelerometer is perpendicular to the local acceleration field. In this position both bridges 20 and 30 are adjusted for zero output. The energizing voltages applied to the two bridges 20 and 30 are adjusted so that the outputs therefrom cancel when the arm is in any position. With the arm member 10 extending vertically downward hydraulic pressure is applied to the system. Any movement of the arm member 10 is nulled out by the bias control 57. The gain desired in the servo loop including the strain gages 60 is adjusted by gain control 50. With such an adjustment the amplifier 45 provides essentially zero output and therefore at any orientation of the arm member 10 and for any acceleration field the arm member will not move in the absence of force applied by the operator. The gain of the servo loop is raised sufficiently to counteract actuator friction to the degree desired.

Electrical networks may be provided at the input and output of the amplifier 45 to provide stabilization to the servo loop and filter out extraneous AC noise signals. Also, stabilizing elements such as orifices in a feedback path between input and output of the servo valve 14 may be provided if desired and needed by the system requirements.

In operation a load to be balanced such as the limb of an operator is attached to the arm member 10. In an acceleration field the movement at the base of the arm member 10 is sensed and measured by the strain gages at 15 and 16 and is a function of the total weight of arm member and load arm member length angular orientation of the arm member relative to the acceleration field, and the magnitude of the acceleration field. The accelerometer 17 senses and produces an output proportional to the magnitude and direction of the acceleration field with respect to the arm member. Since the accelerometer 17 is mounted on the center of rotation of the arm member, angular acceleration of the arm member does not affect the accelerometer response. The difference between the strain gage and the accelerometer signal is amplified and drives a servo valve 14. The hydraulic output from the servo valve 14 applies torque to the actuator 13. As mentioned above, in an acceleration field the difference between the output of the strain gages and the accelerometer outputs is adjusted so that the torque produced by the actuator 13 counteracts the inertia forces applied to the load regardless of arm orientation with respect to the acceleration field. If a torque is now applied, by the limb of an operator for example, to the arm member a signal would be generated by the strain gage at 15 and 16 as friction of the actuator would resist movement of the arm member. Such signal when amplified produces flow to the actuator 13 to move it in the direction of the applied torque. Because of the gain of the servo loop around the actuator, the torque required to move the arm member is much less than actuator friction torque.

Accordingly, it is seen that the system described above is a servo restraint device which counterbalances a load regardless of the acceleration field impressed on the load. While the manner of application of the invention to a single joint has been described, a plurality of joints similar to the one described could be included in a system to provide additional degrees of balance and freedom of operation. If arm members such as arm member 10, or harness, were individually attached to an operator's arms, head and back, with each joint powered by a servo restraint device, the inertial forces normally resisted by the operator during high acceleration maneuvers in an aircraft, for example, would be resisted by the servo powered harness. A fail-safe check valve could be provided between the servo valve 14 and the actuator 13 to prevent locking of the actuator 13 due to power failure. The operator would simply have to handle the added inertia of the arm member or harness and overcome actuator friction.

With regard ot the system described in connection with FIGS. 1, 2, 3 and 4, the following list sets forth standard components of the type which may be used therein:

Accelerometer 17—Unbounded strain gage type of accelerometer
Type 4–203–001 made by Consolidated Electrodynamics Corp. of Monrovia, Calif.
Strain gages 60—four BLH SR–4 strain gages Type FAE–25–3559 made by Baldwin-Lima-Hamilton Corporation
Amplifier 45—Model 82–137 D-C Servocontroller made by Moog Inc., of East Aurora, N.Y.
Servo valve 14—Moog Series 31 Flow Valve made by Moog Inc., of East Aurora, N.Y.
Actuator 13—Houdaille HYD–RO–AC Tiny Model made by Houdaille Hydraulics, Buffalo, N.Y.

Arm member 10 may be made of high strength aluminum to obtain maximum strain for a given loading.

The apparatus described may also be used to counterbalance loads. Unlike counterbalance weights which have been heretofore used for such purposes, the moment of inertia of the load is not appreciably increased by the counterbalancing apparatus. A load such as a jet engine when counterbalanced with a servo restraint device could be effortlessly placed in a position with all of the reaction forces due to bumping of objects reflected back to the operator who would have a direct hold of the load. Also, where it is desired to counterbalance linear forces as, for example, in a hoist, the strain member corresponding to arm 10 would be a load cell which is subject to strain under load and of course an accelerometer would not be needed.

While the invention has been described in specific embodiments, it will be appreciated that many modifications may be made by those skilled in the art, and we intend by the appended claims to cover all such modifications as fall within the true spirit and scope of the invention.

What we claim as new and desire to secure by Letters Patent of the United States is:

1. In combination,
   a member having a longitudinal axis and mounted at one end to pivot about a pivotal axis, said member being adapted to hold the limb of an operator,
   actuator means for pivoting said member about said pivotal axis, a first sensing means for sensing the acceleration of said member about said pivotal axis and for developing a first signal corresponding to the magnitude and direction of said acceleration,
   a second sensing means for sensing the acceleration of said pivotal axis in a direction normal to the longitudinal axis of said member and to said pivotal axis and for developing a second signal corresponding to the direction and magnitude of said acceleration,
   said actuator being responsive to said first signal to cause said actuator means to apply force to said member in a direction to aid the force on said member causing the acceleration of said member about said pivotal axis,
   said actuator means being responsive to said second signal to cause said actuator means to apply a force to said member in a direction which opposes the force on said member causing the acceleration of said member about said pivotal axis,
   whereby when said member and said actuator are subjected to a common acceleration field said member is maintained substantially stationary with respect to said pivotal axis and when a force is applied to said member to pivot said member about said pivotal axis said actuator aids the movement of said member in the direction of said applied force.

2. A system for maintaining a limb of an operator in a relatively fixed position with respect to his body when he is subjected to an acceleration field yet allow the operator to freely move the limb with respect to his body comprising
   a member having a longitudinal axis and mounted at one end to pivot about a pivotal axis, said member adapted to hold the limb of the operator,
   actuator means for pivoting said member about said pivotal axis,
   a first sensing means for sensing the acceleration of said member about said pivotal axis and for developing a first signal corresponding to the magnitude and direction of said acceleration,
   a second sensing means for sensing the acceleration of said pivotal axis in a direction normal to the longitudinal axis of said member and to said pivotal axis and developing a second signal corresponding to the direction and magnitude of said acceleration, amplifier means for providing driving power to said actuator to pivot said member about said pivotal axis, means for applying said first signal to said amplifier means in a polarity to aid the force producing the acceleration causing said member to pivot about said pivotal axis, means for applying said second signal to said amplifier means in a polarity to oppose the force producing the acceleration of said member about said pivotal axis, whereby when said member and said actuator are subject to a common acceleration field said member is maintained substantially fixed with respect to said pivotal axis and when a force is applied to said member to pivot said member about said pivotal axis, said actuator aids movement of said member in the direction of the applied force.

3. The combination of claim 2 in which the signals from said first and second signal generating means are nulled for acceleration applied to said system.

4. The combination of claim 2 in which said member is subject to strain in response to applied stress in the form of torque applied to said member about said pivotal axis and in which said first sensing means is a strain gage mounted on said member near said pivotal axis thereof to sense strain in said member.

References Cited

UNITED STATES PATENTS

| | | | |
|---|---|---|---|
| 2,754,465 | 7/1956 | Brier | 318—488 |
| 3,197,137 | 7/1965 | Watson | 73—510 |

FOREIGN PATENTS

| | | | |
|---|---|---|---|
| 736,226 | | Great Britain | 73—517 |

JAMES J. GILL, Primary Examiner

H. GOLDSTEIN, Assistant Examiner